United States Patent Office 3,436,341
Patented Apr. 1, 1969

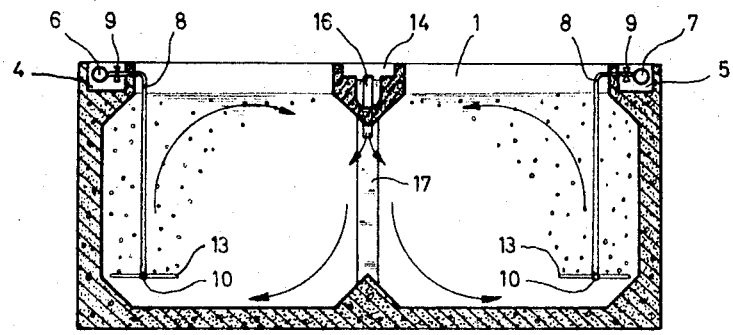
Fig. 4
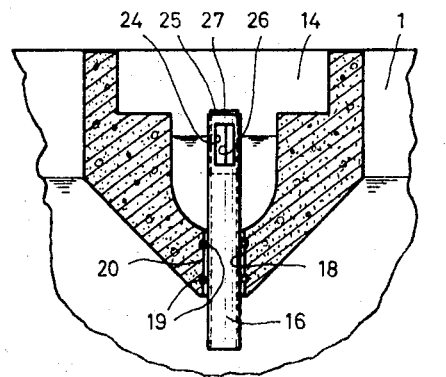
Fig. 5
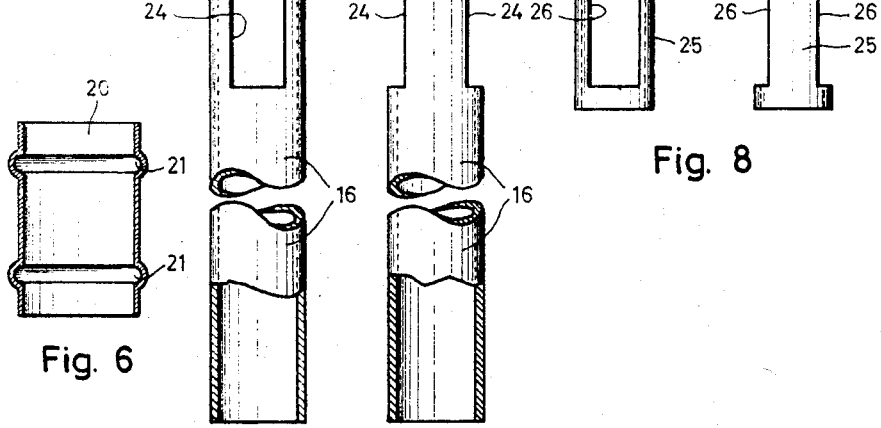
Fig. 6
Fig. 7
Fig. 8

3,436,341
METHOD AND APPARATUS FOR WATER PURIFICATION
Carl-Georg Beuthe, Oppenweiler, Germany, assignor to Schumacher'sche Fabrik, Bietigheim, Wurttemburg, Germany
Filed Dec. 15, 1966, Ser. No. 601,995
Claims priority, application Germany, Dec. 22, 1965, Sch 38,234
Int. Cl. C02c 1/06
U.S. Cl. 210—7
11 Claims

ABSTRACT OF THE DISCLOSURE

A process and an arrangement for the biogilcal purification of waste water. Waste water and oxygen are added at spaced points to a stream of activated sludge. The amount of waste water and oxygen added decreases in the direction of flow; the proportion of waste water added at such point to the total amount of solids in the mixture at the respective point is constant for all points and the amount of oxygen added at each point is proportional to the amount of waste water added at the respective point.

---

The present invention relates to a process and arrangement for the biological purification of water by mixing varying amounts of the water to be purified, with activated sludge and varying amounts of oxygen.

Heretofore, arrangements of the preceding species included ventilating basins having an elongated shape. The waste water or water to be purified was injected into the basin through the longitudinal sides thereof. In addition to this, oxygen as contained in the air, was also supplied along the longitudinal sides of the basin. The latter was also designed to accept and intermix a definite amount of concentrated solid material in the form of feedback sludge, with the remaining contents of the ventilating basin. The feedback sludge serves as the carrier for the biological microorganisms. A filter or purification bed receives the output of the ventilating basin and separates the solid material from the mixture of the basin so as to form purified water. The filted or purification bed concentrates the solid material which can subsequently be drawn off at the bottom of the filter bed. A pump may be provided to return a portion of the drawn off solid material to the input of the ventilating basin, in the form of feedback sludge.

In the commonly-known process constant amounts of waste water and oxygen or air are intermixed along the longitudinal flow axis of the ventilating basin. Thus, in the direction of flow from the front end to the rear end of the basin, the velocity of flow as well as the concentration of the waste water and return sludge in relation to the suspended solid matter, are reduced. Accordingly, the incoming waste water is not sufficiently processed and the very diluted sludge-waste water mixture is transferred directly again into the filter or purification bed. As a result, the water derived from this process leaves much to be desired from the purification point of view.

According to one commonly-known process, the entire amount of waste water to be purified together with the return sludge is injected into the ventilating basin at the front end. After proper intermixing, the resulting mixture is tapped from the basin at the output or rear end. This mixture provided at the output of the ventilating basin is then transferred to the purification or filter bed for separating the solid material and providing purified water. Although this process provides satisfactory results in terms of the purity of the water, the ventilating basin must be of relatively large dimensions, and significantly large amounts of sludge must be circulated within the process.

The commonly-known processes, heretofore, have, further, had the distinct disadvantage whereby they supply more oxygen to the process than that required. Thus, with uniform oxygen distribution more oxygen, than that actually necessary, has to be injected, since the oxygen requirement varies along the direction of flow of the mixture, and the necessary oxygen distribution cannot be predetermined.

Accordingly, it is an object of the present invention to provide a process, for the purification of water, which has low operating costs.

Another object of the present invention is to provide an arrangement whereby the purification process, as described, is carried out in a relatively small apparatus.

A further object of the present invention is to provide a process for the purification of water wherein the water to be purified is biologically treated with oxygen and activated sludge.

A still further object of the present invention is to provide a water purifying process, of the character described, wherein the water to be purified and the oxygen are added and intermixed in varying quantities during the process.

With the preceding objects in view, the present invention comprises a process for purifying impure liquids, comprising the steps of creating a flow of a purifying agent containing solids along a predetermined path, adding to the flow of purifying agent at points along the path impure liquid containing also solids to be removed so that at each of the points the flow contains a total amount of solids derived from the solids contained in the purifying agent and from the solids contained in the impure liquid added up to the respective point, the impure liquid being added at each of the points in such amounts that the proportion of the impure liquid added at each of the points to the total amount of solids at the respective point is constant for all points.

It has been found that particularly good results are realized if the amounts of waste water to be purified are supplied along the length of the ventilating basin in varying amounts and reduced according to a quadratic function having the following form:

$$\frac{q_{z \cdot x}}{\overline{q_z}} = \frac{Q_r}{2 Q_z} \cdot \frac{\left(\frac{Q_z}{Q_r}+1\right)^2 - 1}{\sqrt{\frac{x}{l}\left[\left(\frac{Q_z}{Q_r}+1\right)^2 - 1\right]+1}}$$

where $Q_z$ = flowing amounts of waste water in m.³/hr.
$Q_r$ = amounts of sludge in m.³/hr.
$\overline{q_z}$ = means waste water inflow per meter of basin length and unit of time in m.³/hr. m
$q_{z x}$ = waste water inlet amount at the point X of the basin in m.³/hr. m
$l$ = length of the basin in meters.

The invention may be further extended to vary the amount of oxygen to be supplied along the length of the ventilating basin. If desired, the oxygen or air may be injected at points along the length of the basin, so that the amount of oxygen thus injected, is proportional to the amount of waste water injected at their respective points.

The quadratic function relating the oxygen quantity to the injection point is as follows:

$$OB_x = \frac{Q_r}{2 \cdot l} \frac{\left(\frac{Q_z}{Q_r}+1\right)^2 - 1}{\sqrt{\frac{x}{l}\left[\left(\frac{Q_z}{Q_r}+1\right)^2 - 1\right]+1}} \left(c_{z_o}\left(1 - \sqrt{\frac{3}{4}SB - 0{,}3\ SB^{3/2}}\right)\right)$$

in this formula:

$OB_x$ = effective oxygen requirement at the point X per running meter of the basin length in kp./meter/hr.

$SB$ = means sludge charge or theoretical oxygen requirement according to laboratory analysis based on the amount of the sludge solid materials and on the time in kp./kilogram/day.

$C_{zo}$ = concentration of the inflow in organic impurities expressed in the order of magnitude of the theoretical oxygen requirement according to laboratory analysis for the treatment of a definite amount of waste water in kp./cu. meter.

The injection of waste water in air into and along a ventilating basin, in continuously varying amounts, involves certain difficulties from the practical point of view. This problem is overcome by subdividing the length of the ventilating basin into a number of sections. Within each section the amounts of waste water and air injected therein is constant. However, the amounts of waste water and air injected at each section varies from those of other sections. This procedure is analogous to approximating the desired non-linear function by a series of connected straight lines. When the basin is subdivided into ten equal sections, the distribution of the waste water and air or oxygen supplied to the basin, is illustrated by the following table corresponding to 33%, 50% and 100% return sludge.

TABLE

Distribution of waste water feed and oxygen requirements over the length of the basin with 33%, 50% and 100% retrograde sludge.

| Amount of waste water supply, $Q_x$ | Amount of sludge, $Q_r$ | Waste water feed and oxygen requirements in percent of the total amount in each tenth of the basin length | | | | | | | | | |
|---|---|---|---|---|---|---|---|---|---|---|---|
| | | 1 | 2 | 3 | 4 | 5 | 6 | 7 | 8 | 9 | 10 |
| 100 | 100 | 14.0 | 12.5 | 11.3 | 10.5 | 9.8 | 9.2 | 8.7 | 8.3 | 7.95 | 7.65 |
| 100 | 50 | 17.1 | 13.5 | 11.6 | 10.3 | 93.8 | 8.6 | 8.15 | 7.55 | 7.2 | 6.8 |
| 100 | 33 | 19.4 | 13.7 | 11.9 | 9.7 | 8.95 | 8.25 | 7.6 | 7.15 | 6.75 | 6.4 |

The process, according to the present invention, is preferably carried out in a ventilating basin wherein at least one waste water channel is arranged somewhat above the level of the liquid, and is communicating with the basin by means of overflow pipes adjustable in height. Such a ventilating basin has the advantage that by adjusting the height of the pipes the supply of waste water can be precisely regulated when the basin has settled or subsided in one direction. Such settling of a ventilating basin is particularly to be expected, if it is erected on land having poor foundation quality.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 4 is a cross-sectional view taken along line 4—4 in FIG. 3, and shows the manner in which the waste water and air are injected into the ventilating basin and are intermixed;

FIG. 5 is a partial cross-sectional view of a portion of FIG. 4, and shows the manner in which the overflow pipes are supported in the ventilating basin;

FIG. 6 is a cross-sectional view of the sleeve for supporting the overflow pipe, shown in FIG. 5, within the basin;

FIG. 7 is an elevational view of the overflow pipe, of FIG. 5, with parts broken away to show the construction for regulating the flow of water therethrough; and FIG. 8 shows elevational and side views of the member cooperating with the overflow pipe of FIG. 7, to regulate the water therethrough by forming a valve arrangement.

Figure 1:
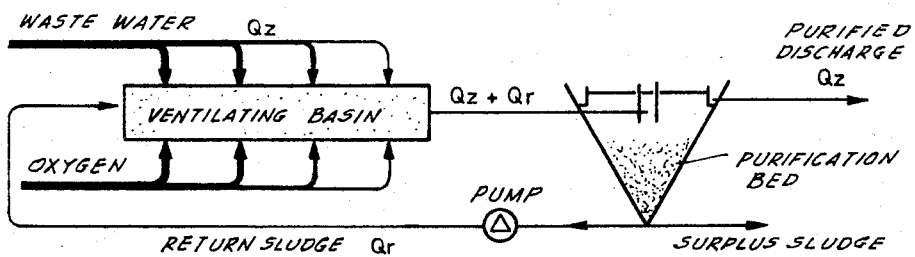
FIG. 1 is a functional block diagram illustrating the arrangement whereby the process of the invention is carried out.

Referring to the drawings and in particular to FIG. 1, waste water and oxygen are supplied to a ventilating basin along the elongated sides thereof. Activated sludge is supplied to the ventilating basin at the end opposite to that where the sludge-waste water mixture is removed from the basin. The sludge-waste water mixture derived from the basin is introduced into a purification bed which provides a purified discharge by separating the sludge from the input mixture. Thus, when the waste water $Q_z$ is mixed with sludge $Q_r$ in the ventilating basin, the mixture $Q_z + Q_r$ is applied to the purification bed. The latter functions to remove the $Q_r$ from the mixture $Q_z + Q_r$ and, therefore, leaves a discharge $Q_z$ in the form of purified water. The sludge resulting from the separating process in a purification bed, is partially returned to the ventilating basin, through means of a circulating pump shown in FIG. 1. The remaining sludge from the purification bed is transmitted in the form of excess sludge.

Figure 2:
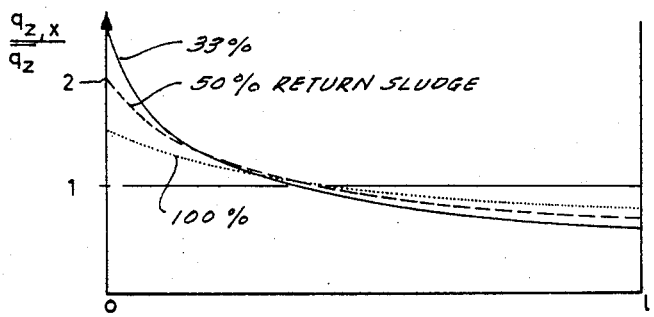
FIG. 2 is a graphical plot showing the distribution of the waste water supply as well as the oxygen supply, as a function of the injection point along the ventilating basin, for varying percentages of return sludge.

FIG. 2 indicates that the inflow of waste water, or water to be purified, is less at the output end or rear end of the ventilating basin than at the front end thereof. The slope of the curve of FIG. 2, furthermore, reveals that the rate of reduction of the waste water inflow is greater at the front end than at the rear end of the ventilating basin. This same reduction relationship applies to the oxygen supplied to the ventilating basin. Analysis of FIG. 2 also leads to the conclusion that when the sludge-waste water mixture contains a high percentage of waste water, the variation in the amount of waste water to be supplied along the length of the ventilating basin, is greater than that prevailing when a low percentage of waste water is present in the mixture.

Figure 3:
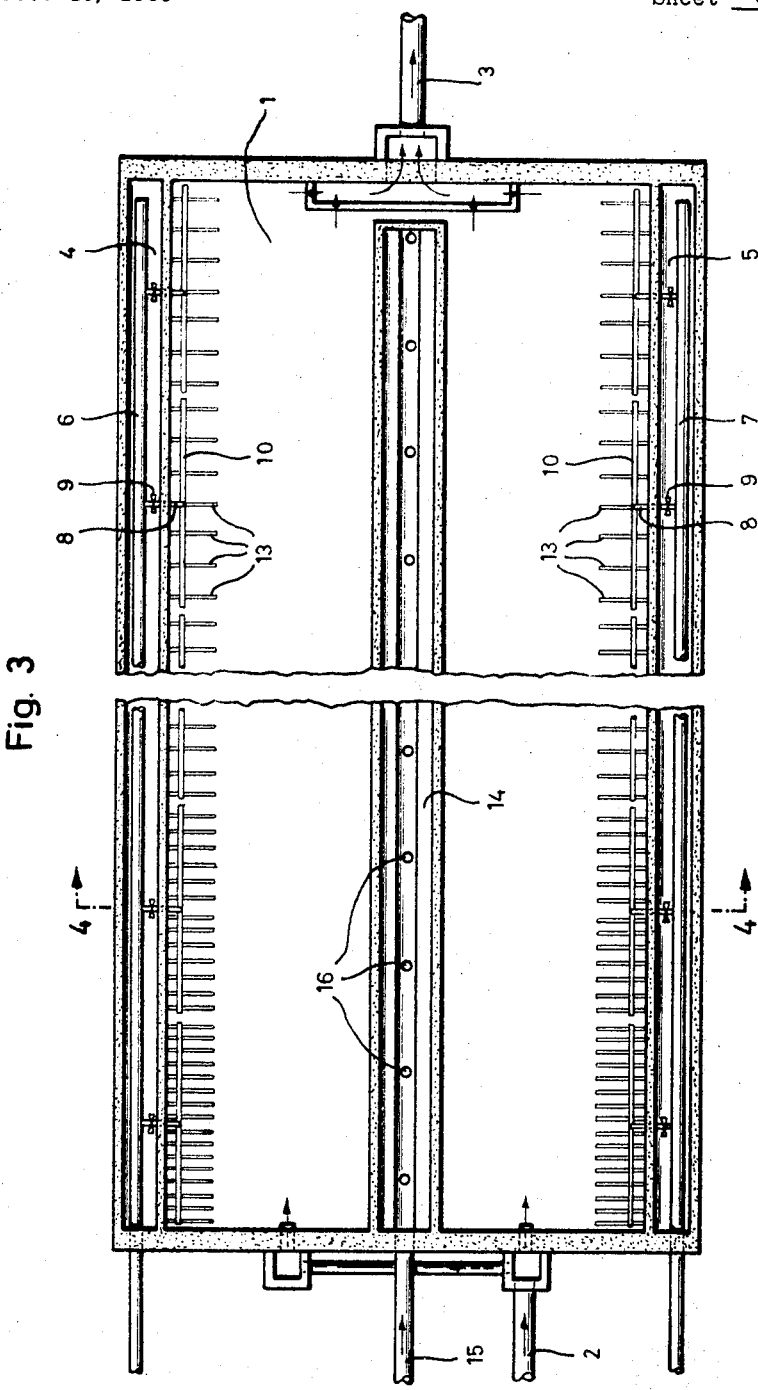
FIG. 3 is an elevational view of the ventilating basin, in accordance with the present invention.

Referring to the construction of the ventilating basin in FIG. 3, a hydraulic tube for the return sludge, communicates with the ventilating basin 1 at the front end thereof. The sludge-waste water mixture prevailing in the basin 1, exits through the tube 3 communicating with the basin at the rear end or output end of the basin.

Along the long side of perimeter of the basin 1, two channels 4 and 5 contain air tubes 6 and 7 respectively. Along each of these air tubes, branch pipes 8 are connected thereto through means of control valves 9. The branch pipes 8 project into the interior of the ventilating basin 1, and terminate, at their ends in distributing tubes 10 arranged along the length of the basin.

A plurality of air distributors 13 communicate with the the distributor tubes 10, and are directed so as to point towards the central interior of the ventilating basin 1.

The air distributors may comprise tubes of sintered material or tubes having fine bore holes.

Along the central region of the ventilating basin, extends a waste water supply channel 14. The latter is located substantially above the level of the liquid maintained within the basin, and communicates with the exterior of the basin through means of the tube or pipe 15. Overflow pipes 16 connect the water water channel 14 with the interior of the ventilating basin 1.

FIG. 4 shows that the waste water supply channel 14 is situated on supports 17, and these do not prevent the flow of the waster water into the basin 1 through the overflow pipes 16. The cross-sectional view of FIG. 4, also shows the spatial relationship of the supply channel 14 with respect to the air distributors 13 situated adjacent to the base of the ventilating basin 1. When air is injected into the sludge-waste water mixture through means of the air distributors thus located, the mixture becomes circulated in the direction indicated by the arrows of FIG. 4.

In accordance with the construction of FIG. 5, the overflow pipes 16 project through openings 18 in the waste water supply channel 14. The walls of the openings or apertures 18 have provision for retaining packing rings 19 which support the overflow pipes 16, through means of friction. For the purpose of mounting the packing rings 19 firmly in place, the opening 18 is lined with a sleeve 20 having annular grooves 21 along the cylindrical surface of the sleeve. The sleeves 20 are embedded in the base of the waste water supply channel 14 and serve as a structural lining and reinforcement for the openings 18. The design details of the sleeve 20 are clearly shown in FIG. 6.

The upper portions of the overflow pipes 16, have cutouts for generating the port openings 24, as shown in FIG. 7. The port openings 24 cooperate with similar openings 26 within the sleeves 25. The latter shown in FIG. 8, is a rotatable member having an inside diameter exceeding the outside diameter of the overflow pipes 16. Thus, the sleeve 25 has an annular cross section of a circular tube, and the port openings 26 are generated through cutouts in the tube similar to that described or the openings 24 in the overflow pipe 16.

In the assembled condition, the upper portion of the overflow pipe 16 resides within the sleeve 25 in a manner, so that the openings 24 and 26 may be brought into coincidence through proper rotation of the sleeve 25. The latter is supported upon the overflow pipe 16 through means of the supporting pin 27 passing through the top of the sleeve as shown in FIG. 8. The pin 27 extends, at both ends, beyond the external surface of the sleeve 25. These two extended portions of the pin 27 rest upon the top end of the overflow pipe 16, when in the assembled condition. The pin 27 thus serves as a means of support for the sleeve 25, as well as a means which may be gripped for rotating the sleeve 25 with respect to the overflow pipe 16. Through such rotation of the sleeve 25, it is possible to bring the opening 26 in various overlapping relationships with respect to the openings 24, ranging from the point where the openings are in full coincidence to the point when they do not overlap at all.

When the openings 26 and 24 thus coincide, the maximum amount of flow may take place through the overflow pipes. When, on the other hand, the openings 24 and 26 do not overlap by any amount, no such flow through the overflow pipe can take place. At any intermediate position of the sleeve 25, partial flow between these two extreme limits may prevail. The sleeve 25 in conjunction with the openings 24 and 26, therefore, serves as a valve for regulating the flow through the pipes 16.

For the purpose of producing the graphical distribution shown in FIG. 2, the number of overflow pipes 16 may be varied, in the proper manner, along the length of the channel 14 extending from the side associated with inflow tube 15 to the side associated with the exit tube 3. Thus, through a proper non-linear arrangement of the overflow pipes 16 along the length of the channel 14, it is possible to vary the waste water inflow into the basin, in accordance with the specification of the curves of FIG. 2. In a similar manner, the oxygen supplied to the water basin may be varied, in accordance with FIG. 2, through proper variation in the number of distributor tubes 13. Accordingly, through selective spacing of the air distributors 13, the configuration specified by FIG. 2 may be closely approximated.

While the invention has been illustrated and described as embodied in water purification arrangements, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What is claimed as new and desired to be secured by Letters Patent is:

1. A process for biological purification of waste water comprising the steps of creating a flow of activated sludge along a predetermined path; adding to said flow of sludge at points along said path waste water containing solids to be removed and oxygen, said waste water being added in amounts decreasing in direction of the flow, said amounts being such that the proportion of the waste water added at each of the points to the total amount of solids in the mixture of sludge and waste water at the respective point is constant for all points and said oxygen being added in amounts decreasing in direction of the flow, said amounts of oxygen added being such that the amount added at each of the points is proportional to the amount of waste water added at the respective point.

2. The process as defined in claim 1, wherein said points at which waste water and oxygen are added are spaced at predetermined intervals along said path.

3. The process as defined in claim 2, wherein waste water and oxygen are added in different amounts at each of said points, and wherein the difference between the amounts added at successive points decreases in direction of said flow.

4. The process as defined in claim 3, wherein the difference of the added amounts is held the greater, the greater total amount of waste water is which is added to the activated sludge.

5. The process as defined in claim 4, wherein the amount of waste water and oxygen supplied along said predetermined path decreases in direction of said flow in accordance with the quadratic function.

6. The process as defined in claim 4, wherein the amount of waste water and oxygen supplied along said predetermined path decreases in direction of said flow in accordance with an exponential function.

7. The process as defined in claim 4 wherein the waste water supplied along said predetermined path in the direction of flow decreases in accordance with the relationship $$\frac{q_{z\cdot x}}{\bar{q}_z} = \frac{Q_r}{2Q_z} \cdot \frac{\left(\frac{Q_z}{Q_r}+1\right)^2 - 1}{\sqrt{\frac{l}{x}\left[\left(\frac{Q_z}{Q_r}+1\right)^2 - 1\right] + 1}}$$

wherein:

$Q_z$ = flowing amounts of waste water in cu. m. per hr.
$Q_r$ = amounts of sludge in cu. m. per hr.
$\bar{q}_z$ = mean waste water inflow amount per continuous metre of basin length and unit of time in cu. m./m hr.
$q_{zx}$ = waste water inlet amount at the point X of the basin in cu. m./m hr.
$l$ = length of the basin in meters.

8. The process as defined in claim 4 wherein said oxygen supplied along said path in the direction of flow decreases in accordance with the relationship $$OB_x = \frac{Q_r}{2 \cdot l} \frac{\left(\frac{Q_z}{Q_r}+1\right)^2 - 1}{\sqrt{\frac{x}{l}\left[\left(\frac{Q_z}{Q_r}+1\right)^2 - 1\right] + 1}} \left(c_{zo}\left(1 - \sqrt{\frac{3}{4}SB - 0{,}3SB^{3/2}}\right)\right)$$

where:
$OB_x$=effective oxygen requirement at the point X per running meter of the basin length in kp./meter/hr.
SB=mean sludge charge or theoretical oxygen requirement according to laboratory analysis based on the amount of the sludge solid materials and on time in kp./kilogram/day
$c_{zo}$=concentration of the inflow in organic impurities expressed in the order of magnitude of the theoretical oxygen requirement according to laboratory analysis for the treatment of a definite amount of waste water in kp./cu. meter.

9. In an apparatus for biological purification of waste water, in combination, an elongated basin; elongated passage means in form of a channel having a bottom wall and being arranged in an upper region of said basin extending in longitudinal direction thereof and being connected at one end to a supply of waste water which is to be purified; a plurality of tubular conduits arranged spaced from each other in longitudinal direction of said channel and extending fluid-tightly sealed through openings in said bottom wall, said conduits each being provided in an upper portion thereof extending into said channel with at least one elongated lateral inlet opening extending in longitudinal direction of the conduit; and adjusting means for regulating the flow of waste water from said channel through the respective conduit with said basin, including means mounting said conduits in said openings in said bottom wall adjustable in axial direction so that the flow of waste water through said inlet openings may be regulated in dependence upon the adjusted height of the respective conduits.

10. The apparatus as defined in claim 9 and including a liner fixed in each opening of said bottom wall and surrounding the respective conduit, each liner being formed with a pair of axially spaced circumferential grooves, and a pair of sealing rings in said grooves sealingly engaging the respective conduit and frictionally holding the same while permitting axial adjustment of the position thereof.

11. In an apparatus for biological purification of waste water, in combination, an elongated basin; elongated passage means in form of a channel having a bottom wall and being arranged in an upper region of said basin extending in longitudinal direction thereof and being connected at one end to a supply of waste water which is to be purified; a plurality of tubular conduits arranged spaced from each other in longitudinal direction of said channel and extending fluid-tightly sealed through openings in said bottom wall, said conduits each being provided in an upper portion thereof extending into said channel with at least one elongated lateral inlet opening extending in longitudinal direction of the conduit; and adjusting means for regulating the flow of waste water from said channel through the respective conduit into said basin, including a sleeve coaxial with said upper portion of each conduit and provided with at least one lateral opening of a cross-section and contour similar to that of said inlet opening in said upper portion of the respective conduit and alignable with said inlet opening, said sleeve being arranged turnable relative to said conduit to change the active cross-section of said inlet openings so as to regulate passage of waste water from said channel through the respective conduits into said basin.

References Cited

UNITED STATES PATENTS

| | | | |
|---|---|---|---|
| 2,979,206 | 4/1961 | Konopka et al. | 210—169 |
| 3,133,017 | 5/1964 | Lambeth | 210—220 X |
| 3,168,465 | 2/1965 | Kravs et al. | 210—221 X |
| 2,337,384 | 12/1943 | Gould | 210—7 |

OTHER REFERENCES

Sawyer: Activated Sludge Modifications, Journal WPCF, vol. 32, March 1960, pp. 232–244.

Imhoff et al.: Sewage Treatment, 2d Edit., 1956, John Wiley & Sons, New York, p. 142.

MICHAEL E. ROGERS, *Primary Examiner.*

U.S. Cl. X.R.

210—220